(12) United States Patent
Kim et al.

(10) Patent No.: US 12,555,803 B2
(45) Date of Patent: Feb. 17, 2026

(54) AIR SUPPLY DEVICE

(71) Applicants: Hyundai Motor Company, Seoul (KR); Kia Corporation, Seoul (KR)

(72) Inventors: Jong Myeong Kim, Gyeonggi-do (KR); Ju Yong Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 711 days.

(21) Appl. No.: 17/890,030

(22) Filed: Aug. 17, 2022

(65) Prior Publication Data

US 2023/0327150 A1 Oct. 12, 2023

(30) Foreign Application Priority Data

Apr. 7, 2022 (KR) .......................... 10-2022-0043516

(51) Int. Cl.
*H01M 8/04007* (2016.01)
*B60H 3/06* (2006.01)
*H01M 8/04119* (2016.01)
*H01M 8/04746* (2016.01)

(52) U.S. Cl.
CPC .......... *H01M 8/04126* (2013.01); *B60H 3/06* (2013.01); *H01M 8/04007* (2013.01); *H01M 8/04753* (2013.01); *H01M 8/04776* (2013.01); *H01M 2250/20* (2013.01)

(58) Field of Classification Search
CPC .................................................. F04D 29/5813
See application file for complete search history.

(56) References Cited

U.S. PATENT DOCUMENTS

| 4,834,624 A | * | 5/1989 | Jensen ................... H02K 9/227 |
| | | | 417/370 |
| 5,947,189 A | * | 9/1999 | Takeuchi ................ F04D 25/06 |
| | | | 123/41.31 |
| 11,339,800 B2 | | 5/2022 | Sakota et al. |
| 2020/0256343 A1 | * | 8/2020 | Sakota .................. F04D 25/082 |

FOREIGN PATENT DOCUMENTS

| WO | 2019-029139 A1 | 2/2019 |
| WO | 2019-087869 A1 | 5/2019 |

* cited by examiner

*Primary Examiner* — Courtney D Heinle
*Assistant Examiner* — Danielle M. Christensen
(74) *Attorney, Agent, or Firm* — Fox Rothschild LLP

(57) ABSTRACT

Disclosed is an air supply device including an intake module configured to introduce air from the outside, a compression module configured to receive the air discharged from the intake module and compress the air, a cooling module configured to cool the air compressed by and discharged from the compression module, and a control module configured to control an operation of the compression module, in which a part of the air in the intake module cools the control module by exchanging heat with the control module.

19 Claims, 6 Drawing Sheets

AIR SUPPLY DEVICE

CROSS-REFERENCE TO RELATED APPLICATION

This application is based on and claims under 35 U.S.C. § 119(a) the benefit of Korean Patent Application No. 10-2022-0043516 filed in the Korean Intellectual Property Office on Apr. 7, 2022, the entire contents of which are incorporated herein by reference.

TECHNICAL FIELD

Embodiments of the present disclosure relate to an air supply device, and more particularly, to an air supply device capable of supplying air to a fuel cell.

BACKGROUND ART

A fuel cell refers to a device that generates electrical energy and water by allowing hydrogen and oxygen to react with each other. The fuel cell uses air, which is plentiful on earth, as fuel without emitting carbon compounds, and thus there is an increasing demand for the fuel cell as an environmental-friendly electric power source.

To operate the fuel cell, components for receiving air from the outside, compressing the air, cooling the air, and then supplying the air to the fuel cell are needed. To this end, accessorial components such as an air compressing device and an air cooling device are also mounted in the equipment in which the fuel cell is mounted.

However, since the accessorial components are separately provided to operate the fuel cell in the related art, thermal management needs to be independently performed on the accessorial components. For this reason, there is severe inefficiency in terms of thermal management for a fuel cell system.

In addition, in the related art, spaces occupied by the accessorial components for operating the fuel cell are separately defined. For this reason, there are problems in that a large volume is required to establish the fuel cell system, and a large number of parts for connecting the accessorial components or fastening the accessorial components are required, which may cause an increase in manufacturing costs.

SUMMARY

The present disclosure has been made in an effort to provide a fuel cell system, in which organic thermal management between accessorial components can be performed in the fuel cell system, which may improve thermal management efficiency and reduce the number of cooling components used for the thermal management.

The present disclosure has also been made in an effort to provide a fuel cell system having a simpler configuration than a fuel cell system in the related art.

An exemplary embodiment of the present disclosure provides an air supply device including: an intake module configured to introduce air from the outside; a compression module configured to receive the air discharged from the intake module and compress the air; a cooling module configured to cool the air compressed by and discharged from the compression module; and a control module configured to control an operation of the compression module, in which a part of the air in the intake module cools the control module by exchanging heat with the control module.

In some embodiments, the control module may include a cooling fin member, and at least a part of the cooling fin member may be disposed in a space in the intake module in which the air flows.

In some embodiments, the control module may further comprise a control board unit, wherein the cooling fin member is in direct contact with the control board unit.

In some embodiments, a part of the air discharged from the cooling module may be introduced into the compression module.

In some embodiments, the air supply device may include a return flow path configured to allow the cooling module and the compression module to communicate with each other, in which a part of the air discharged from the cooling module is supplied to the compression module through the return flow path.

In some embodiments, the compression module may include a compressor, the compressor may include a motor including a rotary shaft and a stator, and the air, which is discharged from the cooling module and introduced into the return flow path, may cool the stator while passing through the stator.

In some embodiments, the compressor may further include an impeller member coupled to the rotary shaft and configured to compress the air introduced into the compression module, and the compressor may have a rear-end flow path that allows the impeller member and the stator to communicate with each other and allows a part of the air introduced into the compression module to flow through the rear-end flow path.

In some embodiments, the return flow path may merge into the rear-end flow path.

In some embodiments, a separate opening/closing valve is provided in the rear-end flow path.

In some embodiments, the compressor may further include a first bearing disposed at one side of the rotary shaft and configured to support the rotary shaft in a longitudinal direction in which the rotary shaft extends, and the air, which is discharged from the cooling module and introduced into the return flow path, may cool the first bearing while passing through the first bearing.

In some embodiments, the air supply device may further include: a second bearing disposed at one side of the rotary shaft and configured to support the rotary shaft in a direction intersecting the longitudinal direction in which the rotary shaft extends, in which the air, which is discharged from the cooling module and introduced into the return flow path, cools the second bearing while passing through the second bearing.

In some embodiments, a hollow portion may be formed in the rotary shaft and extend in a longitudinal direction of the rotary shaft, and the return flow path may communicate with the hollow portion.

In some embodiments, the air supply device may further include a humidification module configured to receive the air discharged from the cooling module and humidify the air, in which the return flow path is disposed between the cooling module and the humidification module.

In some embodiments, the air supply device may further include: a fuel cell module into which the air discharged from the humidification module is introduced; and a humidification flow path configured to connect the fuel cell module and the humidification module and supply a fluid, which is discharged from the fuel cell module to the humidification module.

In some embodiments, the intake module may face one side of the compression module based on a forward/rearward direction F, and the cooling module may face one side of the compression module based on a leftward/rightward direction W.

In some embodiments, the humidification module may face one side of the compression module based on the leftward/rightward direction W and one side of the cooling module based on a forward/rearward direction F.

In some embodiments, the control module may face one side of the compression module based on an upward/downward direction H.

According to the present disclosure, it is possible to provide the fuel cell system, in which the organic thermal management between the accessorial components can be performed in the fuel cell system, which may improve thermal management efficiency and reduce the number of cooling components used for the thermal management.

In addition, according to the present disclosure, it is possible to provide the fuel cell system having a simpler configuration than a fuel cell system in the related art.

As discussed, the method and system suitably include use of a controller or processer.

In another embodiment, a fuel cell is provided that comprise an air supply devices as disclosed herein. Also, a vehicle is provided that comprises such a fuel cell.

DETAILED DESCRIPTION

Figure 1:
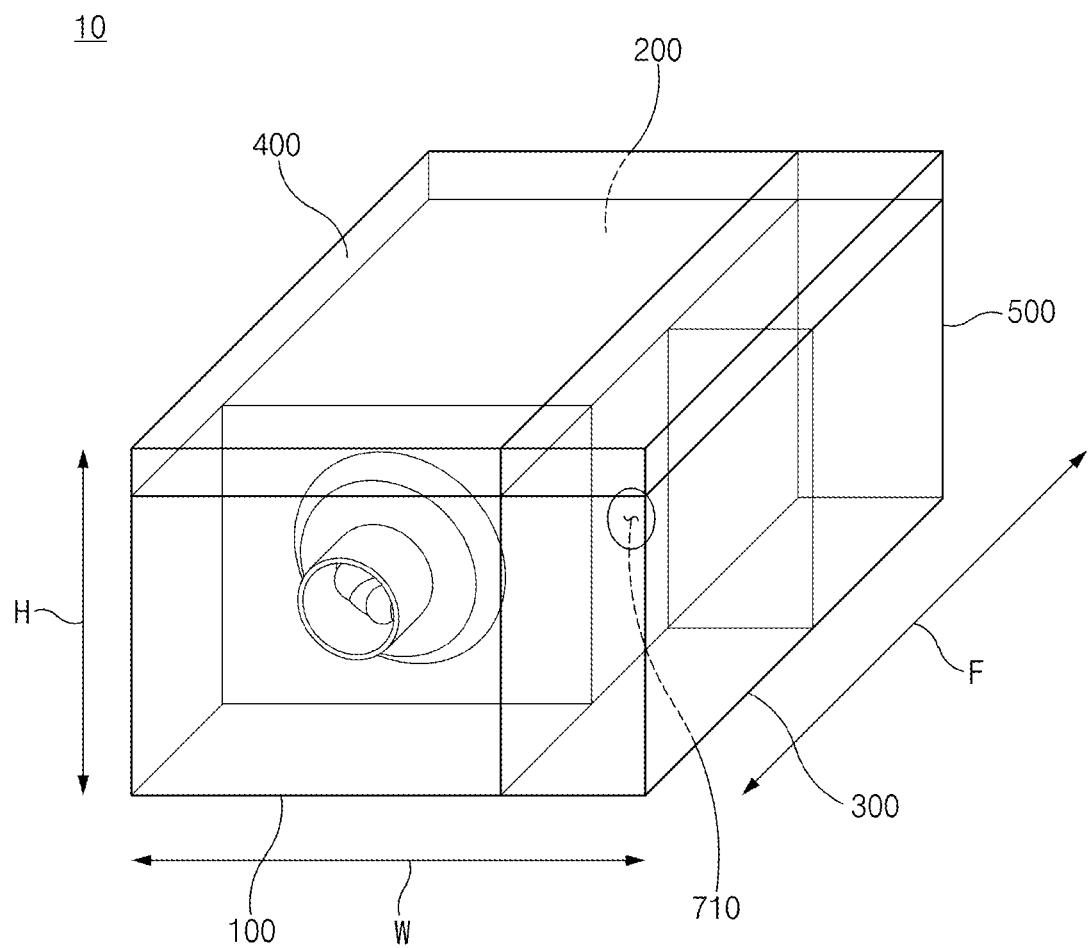
FIG. 1 is a view illustrating a schematic structure of an air supply device according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an air supply device according to the present disclosure will be described with reference to the drawings.

Air Supply Device

Figure 2:
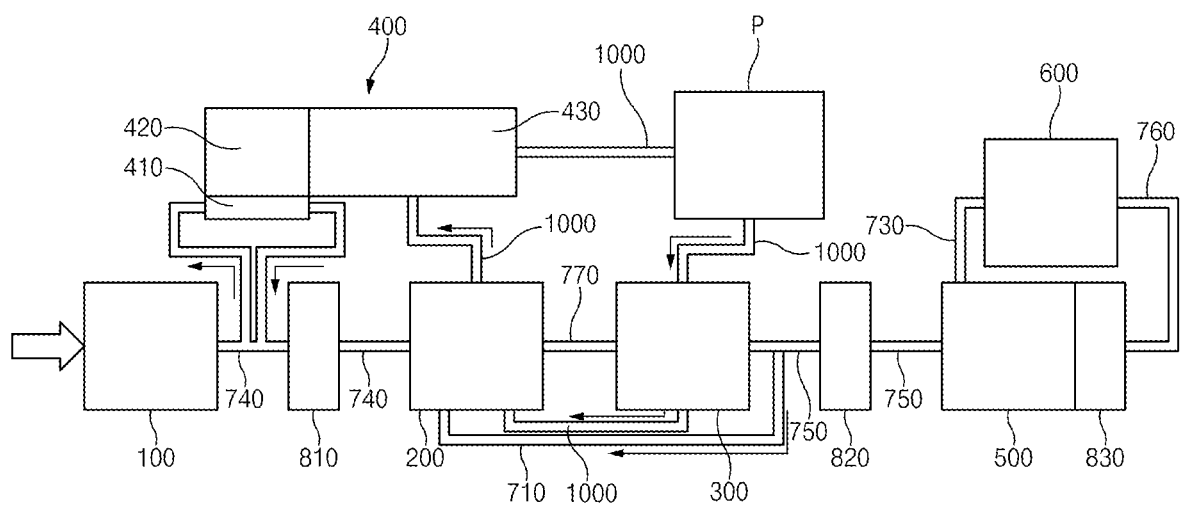
FIG. 2 is a view illustrating a cooling line of the air supply device according to the present disclosure.
Figure 3:
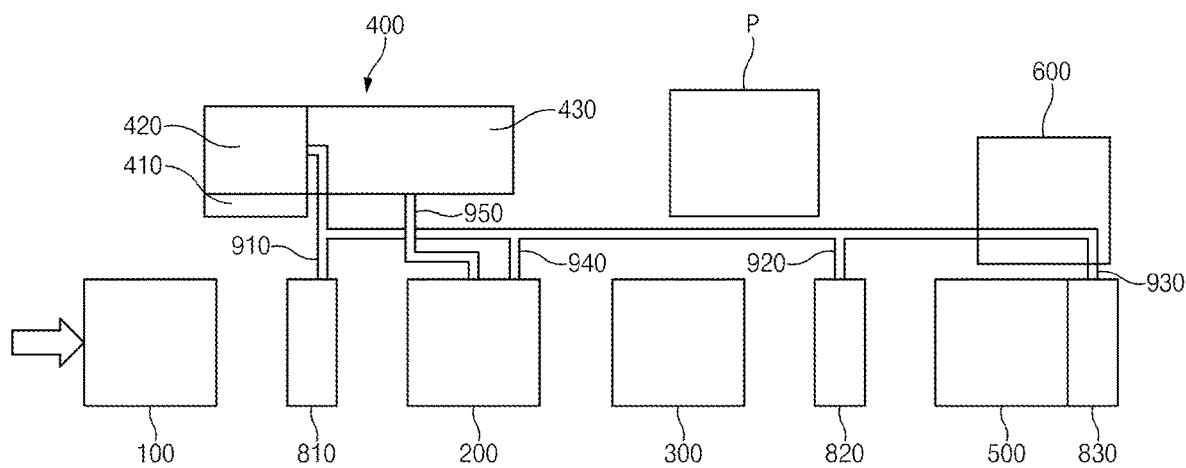
FIG. 3 is a view illustrating a signal line and a power line of the air supply device according to the present disclosure.
Figure 4:
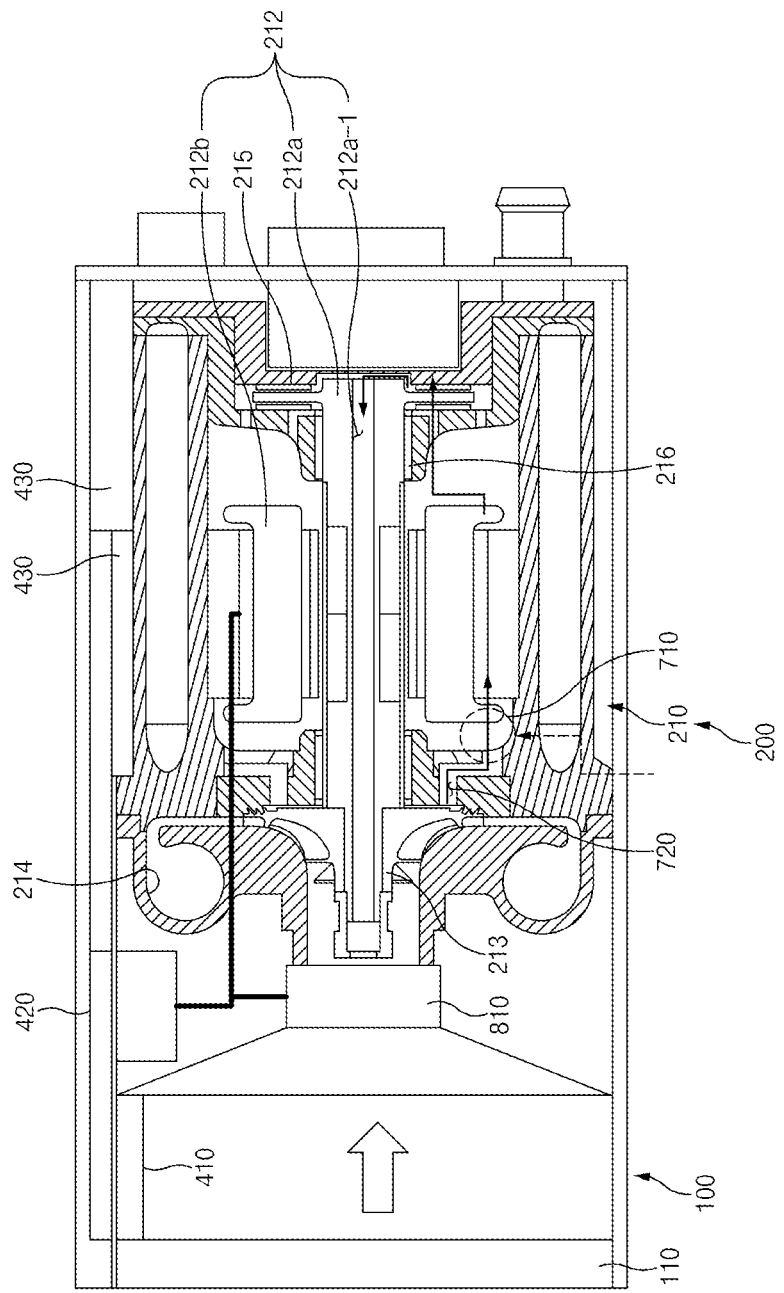
FIG. 4 is a cross-sectional view illustrating structures of an intake module, a compression module, and a control module of the air supply device according to the present disclosure.
Figure 5:
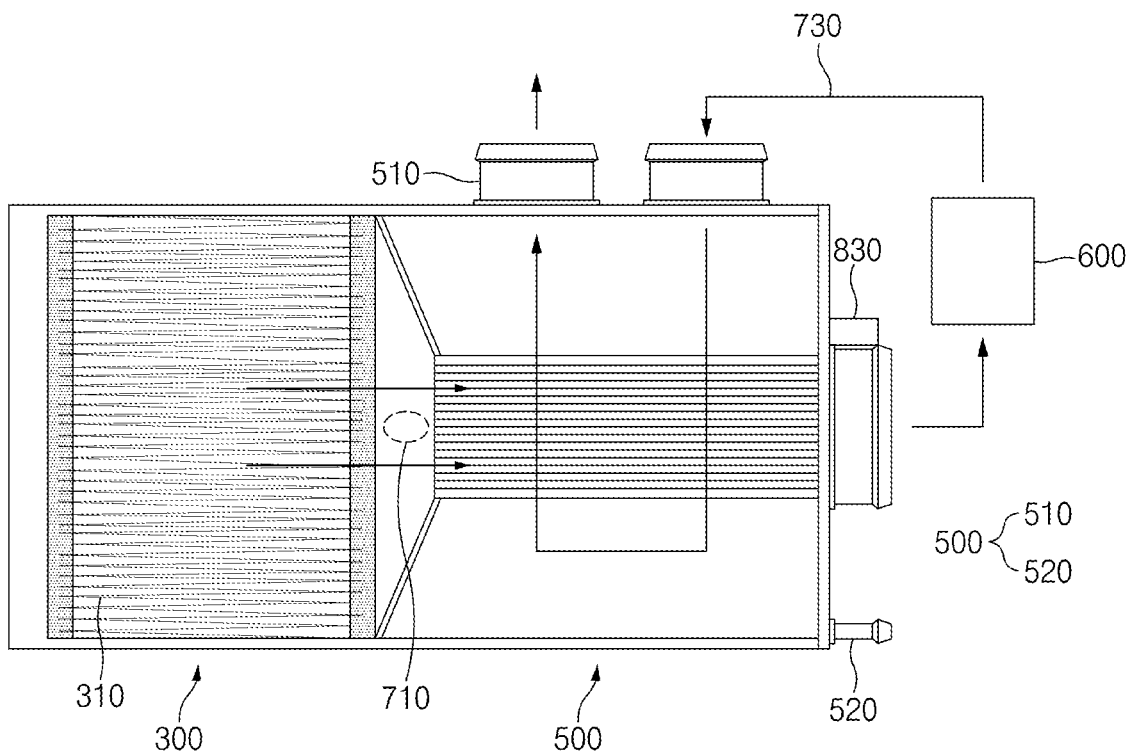
FIG. 5 is a cross-sectional view illustrating structures of a cooling module and a humidification module of the air supply device according to the present disclosure.
Figure 6:
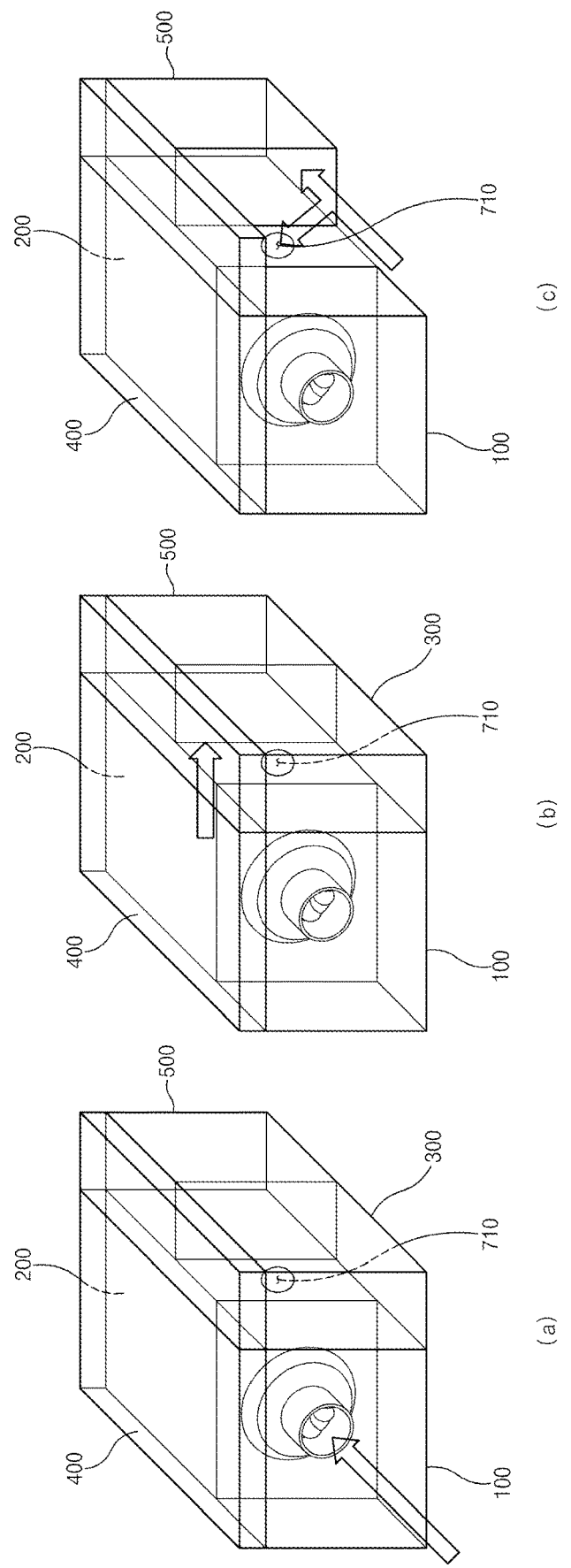
FIG. 6 is a view illustrating a flow of air in the air supply device according to the present disclosure in a time series manner.

FIG. 1 is a view illustrating a schematic structure of an air supply device according to the present disclosure, and FIG. 2 is a view illustrating a cooling line of the air supply device according to the present disclosure. FIG. 3 is a view illustrating a signal line and a power line of the air supply device according to the present disclosure, and FIG. 4 is a cross-sectional view illustrating structures of an intake module, a compression module, and a control module of the air supply device according to the present disclosure. FIG. 5 is a cross-sectional view illustrating structures of a cooling module and a humidification module of the air supply device according to the present disclosure, and FIG. 6 is a view illustrating a flow of air in the air supply device according to the present disclosure in a time series manner.

An air supply device 10 according to the present disclosure may serve to receive air from the outside, cool the air, and then supply the air to a fuel cell module. In particular, according to the present disclosure, a part of the air supplied from the outside may also contribute to i) cooling a compression module configured to compress air, and ii) cooling a control module configured to control an operation of the compression module, which makes it possible to improve cooling efficiency of the air supply device. To achieve the above-mentioned object, the components in the air supply device 10 according to the present disclosure may be efficiently disposed in a limited space.

Referring to FIGS. 1 and 4, the air supply device 10 according to the present disclosure may include an intake module 100 configured to introduce air from the outside. More specifically, air may be introduced through one side of the intake module 100, and the air may be supplied to a compression module, which will be described below, through the other side of the intake module 100. An intake filter 110 may be provided at one side of the intake module 100. Foreign substances contained in the air may be filtered out by the intake filter 110 while the air introduced into the intake module 100 passes through the intake filter 110.

As illustrated in FIGS. 1 to 4, the air supply device 10 may further include a compression module 200 configured to receive the air discharged from the intake module 100 and compress the air. The air introduced from the intake module 100 may be compressed by the compression module 200 and then supplied to a cooling module to be described below.

More specifically, as illustrated in FIG. 4, the compression module 200 may include a compressor 210 configured to compress air. The compressor 210 may include a motor 212 including a rotary shaft 212a and a stator 212b. The stator 212b, which is supplied with electric current from the outside, may change a magnetic field around the stator 212b over time. The rotary shaft 212a may be rotated by the change in the magnetic field over time, thereby compressing the air. Because the method of operating the motor 212 is widely known in the related art, a description thereof will be omitted in the present specification.

The compressor 210 may further include an impeller member 213 coupled to the rotary shaft 212a and configured to compress the air introduced into the compression module 200. The impeller member 213 fixedly coupled to the rotary shaft 212a may rotate together with the rotary shaft 212a as the rotary shaft 212a rotates. The air may be compressed in a centrifugal direction by the rotation of the impeller member 213. More specifically, as illustrated in FIG. 4, a discharge unit 214 may be disposed outside the compressor 210. The air compressed by the rotation of the impeller member 213 may be discharged to a cooling module 300, which will be described below, through the discharge unit 214.

Referring to FIG. 4, the compressor 210 may further include: a first bearing 215 disposed at one side of the rotary shaft 212a and configured to support the rotary shaft 212a in a longitudinal direction in which the rotary shaft 212a extends; and a second bearing 216 disposed at one side of the rotary shaft 212a and configured to support the rotary shaft 212a in a direction intersecting the longitudinal direction in which the rotary shaft 212a extends. For example, the first bearing 215 may be a thrust bearing, and the second bearing 216 may be a journal bearing. FIG. 4 illustrates that the impeller member 213 is fixedly coupled to one side of the rotary shaft 212a based on the longitudinal direction, and the first bearing 215 is coupled to the other side of the rotary shaft 212a based on the longitudinal direction. In addition, FIG. 4 illustrates that two second bearings 216 are provided. As illustrated in FIG. 4, one second bearing 216 provided at the one side of the rotary shaft 212a based on the longitudinal direction and disposed adjacent to the impeller member 213, and the other second bearing 216 is provided at the other side of the rotary shaft 212a based on the longitudinal direction and disposed adjacent to the first bearing 215, such that the two second bearings 216 face each other with the stator 212b of the compressor 210 interposed therebetween.

Meanwhile, as illustrated in FIGS. 1 to 3 and 5, the air supply device 10 according to the present disclosure may further include the cooling module 300 configured to cool the air discharged after being compressed by the compression module 200. More specifically, the cooling module 300 may further include heat exchange members 310, and the air introduced into the cooling module 300 may be cooled by exchanging heat with the heat exchange members 310. For example, the heat exchange member 310 may be a cooling fin. FIG. 5 illustrates that the heat exchange members 310 each having a cooling fin structure are disposed in a zigzag manner in order to maximize heat exchange areas between the air and the heat exchange members 310.

In addition, as illustrated in FIGS. 1 to 4, the air supply device 10 according to the present disclosure may further include a control module 400 configured to control an operation of the compression module 200. More specifically, the control module 400 may be configured to receive a predetermined signal from the compressor 210 and then control the operation of the compressor 210 in response to the predetermined signal. However, according to the present disclosure, the control module 400 may receive signals from sensor units as well as the compressor 210 and control physical properties (e.g., a flow rate, a temperature, a humidity, and the like) of the air to be supplied to a fuel cell module 600 to be described below in response to the signals provided from the sensor units.

In addition, as illustrated in FIGS. 1 to 3 and 5, the air supply device 10 according to the present disclosure may further include a humidification module 500 configured to receive the air discharged from the cooling module 300 and humidify the air. The air supplied from the humidification module 500 may be humidified by water supplied to the humidification module 500, and then the humidified air may be supplied to the fuel cell module 600 to be described below. As described below, the water supplied to the humidification module 500 may be water discharged as a reactant from the fuel cell module 600. However, the humidification module 500 is not an essential component of the air supply device 10 according to the present disclosure. According to another embodiment of the present disclosure, the air supply device 10 may not include the humidification module.

Referring to FIGS. 2 and 3, the air supply device 10 according to the present disclosure may further include the fuel cell module 600 into which the air discharged from the humidification module 500 (the air discharged from the cooling module when the humidification module is not provided) is introduced. The fuel cell module 600 may be configured to receive hydrogen and oxygen and produce electrical energy through the reaction between hydrogen and oxygen. Because the method of operating the fuel cell is widely known in the related art, a description thereof will be omitted in the present specification.

Meanwhile, according to the present disclosure, a part of the air in the intake module 100 may cool the control module 400 by exchanging heat with the control module 400.

More specifically, as illustrated in FIGS. 2 to 4, the control module 400 may include: a cooling fin member 410; a control board unit 420 provided to be in close contact with one side of the cooling fin member 410; and an element unit 430 provided to be in close contact with one side of the control board unit 420 and including one or more elements. The control board unit 420 may be configured to receive signals from the compressor 210 and the sensor units to be described below, and transmit an operation signal to the element unit 430 in response to the signals. For example, the element unit 430 may include an insulated gated bipolar transistor (IGBT), a DC capacitor, a switching element, and the like.

In this case, as illustrated in FIG. 2, at least a part of the cooling fin member 410 may be disposed in a space in the intake module 100 in which air flows. Therefore, the cooling fin member 410 may exchange heat with the air while the air flows in the intake module 100. The cooled cooling fin member 410 may cool the element unit 430 and the control board unit 420 provided to be in close contact with the cooling fin member 410. Therefore, according to the present disclosure, it is possible to effectively cool, without a separate cooling device, the control board unit 420 that generates a large amount of heat during the operating process of the control module 400.

For example, as illustrated in FIG. 2, the cooling fin member 410 may be in direct contact with the control board unit 420. However, unlike the configuration illustrated in FIG. 2, the cooling fin member 410 may be in direct contact with the element unit 430, or the cooling fin member 410 may be in direct contact with both the control board unit 420 and the element unit 430.

Meanwhile, according to the present disclosure, a part of the air discharged from the cooling module 300 may be introduced into the compression module 200. The air, which is discharged from the cooling module 300 and introduced into the compression module 200, may contribute to cooling the compression module 200. In particular, since the air discharged from the cooling module 300 has been cooled by the cooling module 300, the air introduced into the compression module 200 may more effectively cool the compression module 200.

More specifically, as illustrated in FIGS. 1, 4, and 5, the air supply device 10 may include a return flow path 710 configured to allow the cooling module 300 and the compression module 200 to communicate with each other. A part of the air discharged from the cooling module 300 may be supplied to the compressor 210 of the compression module 200 through the return flow path 710. Therefore, the air introduced into the compressor 210 through the return flow path 710 may contribute to cooling the compressor 210.

In particular, a large amount of heat may be generated particularly from the stator 212b and the bearings 215 and 216 while the compressor 210 operates. Therefore, the air introduced into the compressor 210 through the return flow path 710 needs to contribute to cooling the stators 212b and the bearings 215 and 216.

Therefore, as illustrated in FIG. 4, the air, which is discharged from the cooling module and introduced into the return flow path 710, may not only cool the stator 212b while passing through the stator 212b, but also cool the first bearing 215 and the second bearing 216 while passing through the first bearing 215 and the second bearing 216.

Meanwhile, a hollow portion 212a-1 may be formed in the rotary shaft 212a and extend in the longitudinal direction of the rotary shaft 212a. In this case, the return flow path 710 may communicate with the hollow portion 212a-1. In this case, the configuration in which the return flow path and the hollow portion communicate with each other needs to be interpreted as the configuration in which a space in the return flow path and a space in the hollow portion are directly or indirectly connected to each other so that a fluid flowing in the return flow path may be introduced into the hollow portion.

Therefore, according to the present disclosure, the air, which is discharged from the cooling module 300 and introduced into the return flow path 710, may cool the stator 212b, the first bearing 215, and the second bearing 216 and then be introduced into the hollow portion 212a-1 through one side of the hollow portion 212a-1. The air introduced into the hollow portion 212a-1 may be discharged from the hollow portion 212a-1 through the other side of the hollow portion 212a-1, compressed again by the rotation of the impeller member 213, and then be supplied to the cooling module 300.

Meanwhile, referring to FIG. 5, the return flow path 710 may be provided between the cooling module 300 and the humidification module 500. Therefore, the most part of the air discharged from the cooling module 300 may be introduced into the humidification module 500. However, a part of the air may be introduced into the return flow path 710, supplied to the compression module 200, and then contribute to cooling the compression module 200. In the case in which the air supply device according to the present disclosure includes the humidification module 500, the air introduced into the return flow path 710 may be understood as air that is not in a humidified state by the humidification module 500.

That is, according to the present disclosure, since the air introduced into the compression module 200 through the return flow path 710 is not in a humidified state, it is possible to prevent a problem in that the performance in insulating a region required to be electrically insulated is degraded by moisture in the air and problems in that the performance of the compressor 210 of the compression module 200 deteriorates, and the performance in lubricating the bearing deteriorates.

Meanwhile, according to the present disclosure, another part of the air, which is introduced into the intake module 100 and supplied to the compressor 210, may cool the compression module 200. More specifically, as illustrated in FIG. 4, the compressor 210 may have a rear-end flow path 720 configured to allow the impeller member 213 and the stator 212b to communicate with each other, and a part of the air introduced into the compression module 200 may flow through the rear-end flow path 720. Therefore, a part of the air introduced into the compressor 210 may be introduced into the rear-end flow path 720 without being discharged from the compressor 210 through the discharge unit 214, thereby contributing to cooling the compressor 210. More specifically, like the air introduced into the return flow path 710, the air introduced into the rear-end flow path 720 may cool the stator 212b, the first bearing 215, and the second bearing 216 while passing through the stator 212b, the first bearing 215, and the second bearing 216. Meanwhile, for example, referring to FIG. 4, the return flow path 710 may merge into the rear-end flow path 720. In this case, it is possible to simplify the configuration of the flow path for cooling the compressor 210. Meanwhile, the rear-end flow path 720 may be configured to allow a part of the air, which is to be supplied to the fuel cell module 600, to flow to the compressor 210 so as to cool the compressor 210. However, even in this case, a diameter of the rear-end flow path 720 needs to be small to a degree to which the rear-end flow path 720 does not substantially greatly affect a natural function of the compressor 210, i.e., a function of compressing air. Alternatively, a separate opening/closing valve may be provided in the rear-end flow path 720. In this case, when the compressor 210 needs to be cooled, the valve may be opened so that the air may be supplied to the compressor 210 through the rear-end flow path 720. When the compressor 210 need not be cooled, the valve may be closed to block the flow of the air through the rear-end flow path 720.

Meanwhile, referring to FIG. 1, the intake module 100, the compression module 200, the cooling module 300, the control module 400, the humidification module 500, and the fuel cell module 600 according to the present disclosure may have each independently a modularized structure and be disposed adjacent to one another so that the space occupied by the air supply device 10 may be minimized.

That is, in the related art, devices for supplying air to a fuel cell, for example, a device for introducing outside air, a device for compressing air, a device for cooling air, a device for controlling physical properties and flow rate of air, and a device for humidifying air may be disposed in a system in a dispersed manner, which causes an increase in an overall volume of a fuel cell system. However, according to the present disclosure, the intake module 100, the compression module 200, the cooling module 300, the control module 400, the humidification module 500, and the fuel cell module 600 may be optimally disposed. Therefore, a volume occupied by the air supply device 10 may be minimized and the arrangements of the return flow path 710 and the rear-end flow path 720 may be simplified.

More specifically, as illustrated in FIG. 1, the intake module 100 may face one side of the compression module 200 based on a forward/rearward direction F, and the cooling module 300 may face one side of the compression module 200 in a leftward/rightward direction W. In addition, the humidification module 500 may face one side of the compression module 200 based on the leftward/rightward direction W and one side of the cooling module 300 based on the forward/rearward direction F. Further, the control module 400 may face one side of the compression module 200 based on an upward/downward direction H.

In the case in which the intake module 100, the compression module 200, the cooling module 300, the control module 400, and the humidification module 500 are disposed as described above, the intake module 100, the compression module 200, the cooling module 300, the control module 400, and the humidification module 500 may be disposed compactly in a narrow space, which makes it possible to reduce the space occupied by the air supply device 10. In addition, a length of the return flow path 710, which allows the cooling module 300 and the compression module 200 to communicate with each other, may also be reduced. Further, in addition to the return flow path 710, the rear-end flow path 720, through which the air for cooling the compressor 210 flows, may be provided in the compressor 210 as described above, which makes it possible to remarkably reduce the volume occupied by the flow path for cooling the compressor 210.

Meanwhile, referring to FIG. 5, the air supply device 10 according to the present disclosure may further include a humidification flow path 730 configured to connect the fuel cell module 600 and the humidification module 500 and supply the fluid, which is discharged from the fuel cell module 600, to the humidification module 500. Water is produced by the reaction between hydrogen and oxygen in the fuel cell module 600, and the humidification flow path 730 may be configured to supply the humidification module 500 with the water and the gas that is not involved in the reaction in the fuel cell module 600. Therefore, in the humidification module 500, the air may be humidified by the water introduced through the humidification flow path 730.

In addition, as illustrated in FIG. 5, the humidification module 500 may further include: an air discharge unit 510 configured to discharge the air, which is introduced from the humidification flow path 730, to the outside; and a water discharge unit 520 configured to discharge the water, which is introduced from the humidification flow path 730, to the outside. For example, the air discharge unit 510 may be provided in an upper region of the humidification module 500, and the water discharge unit 520 may be provided in a lower region of the humidification module 500. Meanwhile, the air discharge unit 510 may further include a pressure adjustment valve configured to adjust a pressure of the air to be discharged.

Meanwhile, the air supply device 10 according to the present disclosure may further include a plurality of air flow paths, the sensor units, and a signal line. The air flow path may be configured to provide a route through which the most part of air introduced through the intake module 100 flows. The sensor unit may be disposed in the air flow path and configured to measure information on the air flowing through the air flow path. In addition, the signal line may be configured to information measured by the sensor unit to the control module 400.

More specifically, referring to FIGS. 2 and 3, the air supply device 10 may further include: a first air flow path 740 configured to connect the intake module 100 and the compression module 200; a first sensor unit 810 provided in the first air flow path 740 and configured to measure one or more of a flow rate, a temperature, and a pressure of the air flowing through the first air flow path 740; and a first signal line 910 configured to connect the control module 400 and the first sensor unit 810 and transmit a value measured by the first sensor unit 810 to the control module 400.

In addition, the air supply device 10 may further include: a second air flow path 750 configured to connect the cooling module 300 and the humidification module 500; a second sensor unit 820 provided in the second air flow path 750 and configured to measure one or more of a flow rate, a temperature, and a pressure of the air flowing through the second air flow path 750; and a second signal line 920 configured to connect the control module 400 and the second sensor unit 820 and transmit a value measured by the second sensor unit 820 to the control module 400.

In addition, the air supply device 10 may further include: a third air flow path 760 configured to connect the humidification module 500 and the fuel cell module 600 and allow the air discharged from the humidification module 500 to flow therethrough; a third sensor unit 830 provided in the third air flow path 760 and configured to measure a humidity of the air flowing through the third air flow path 760; and a third signal line 930 configured to connect the control module 400 and the third sensor unit 830 and transmit a value measured by the third sensor unit 830 to the control module 400.

In addition, the air supply device 10 may further include a fourth air flow path 770 configured to connect the compression module 200 and the cooling module 300.

In addition, the air supply device 10 may further include: a fourth signal line 940 configured to transmit a value measured by the compression module 200 to the control module 400; and a power line 950 through which electric power is provided to the compression module 200 from the control module 400. The air supply device 10 may further include a converter configured to convert high-voltage electric power into low-voltage electric power at the time of supplying electric power to the compression module 200 through the power line 950.

As described above, according to the present disclosure, the intake module 100, the compression module 200, the cooling module 300, the control module 400, and the humidification module 500 may be disposed compactly in a narrow space. Therefore, the first to third sensor units 810, 820, and 830 and the first to fourth signal lines 910, 920, 930, and 940 may be connected to the single control module 400. Therefore, according to the present disclosure, the communication between control devices provided to control the control module 400 and the fuel cell module 600 may be simplified, which makes it possible to simplify the process of controlling the air supply device 10.

Meanwhile, referring to FIG. 2, the air supply device 10 according to the present disclosure may further include a cooling line 1000 configured to allow a coolant to flow sequentially through the compression module 200, the cooling module 300, a cooling pump P, and the control module 400. That is, the coolant may sequentially cool the control module 400, the compression module 200, and the cooling module 300 while flowing through the cooling line 1000. In particular, according to the present disclosure, the coolant introduced into the compression module 200 may exchange heat with the air flowing through the return flow path 710 and the rear-end flow path 720. In this case, a temperature of the coolant decreases during the heat exchange process, such that the coolant may more effectively cool the compression module 200.

Hereinafter, a flow of air in the air supply device 10 according to the present disclosure will be described with reference to the above-mentioned description and FIG. 6.

As illustrated in FIG. 6A, when the outside air is supplied to the intake module 100, the air introduced into the intake module 100 may be supplied to and compressed by the compression module 200. Thereafter, as illustrated in FIG. 6B, the air is supplied to the cooling module 300. Thereafter, the air cooled by the cooling module 300 is discharged from the cooling module 300 and then introduced into the humidification module 500. In this case, a part of the air discharged from the cooling module 300 is introduced into the compression module 200 again without being introduced into the humidification module 500, thereby cooling the compression module 200.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. An air supply device comprising:
    an intake module configured to introduce air from the outside;
    a compression module configured to receive the air discharged from the intake module and compress the air;
    a cooling module configured to cool the air compressed by and discharged from the compression module; and
    a control module configured to control an operation of the compression module,
    wherein a part of the air in the intake module cools the control module by exchanging heat with the control module.

2. The air supply device of claim 1, wherein the control module comprises a cooling fin member, and at least a part of the cooling fin member is disposed in a space in the intake module in which the air flows.

3. The air supply device of claim 2, wherein the control module further comprises a control board unit, wherein the cooling fin member is in direct contact with the control board unit.

4. The air supply device of claim 1, wherein a part of the air discharged from the cooling module is introduced into the compression module.

5. The air supply device of claim 4, comprising:
    a return flow path configured to allow the cooling module and the compression module to communicate with each other,
    wherein a part of the air discharged from the cooling module is supplied to the compression module through the return flow path.

6. The air supply device of claim 5, wherein the compression module comprises a compressor, the compressor comprises a motor comprising a rotary shaft and a stator, and the air, which is discharged from the cooling module and introduced into the return flow path, cools the stator while passing through the stator.

7. The air supply device of claim 6, wherein the compressor further comprises an impeller member coupled to the rotary shaft and configured to compress the air introduced into the compression module, and the compressor has a rear-end flow path that allows the impeller member and the stator to communicate with each other and allows a part of the air introduced into the compression module to flow through the rear-end flow path.

8. The air supply device of claim 7, wherein the return flow path merges into the rear-end flow path.

9. The air supply device of claim 7, wherein a separate opening/closing valve is provided in the rear-end flow path.

10. The air supply device of claim 7, wherein the compressor further comprises a first bearing disposed at one side of the rotary shaft and configured to support the rotary shaft in a longitudinal direction in which the rotary shaft extends, and the air, which is discharged from the cooling module and introduced into the return flow path, cools the first bearing while passing through the first bearing.

11. The air supply device of claim 10, further comprising:
    a second bearing disposed at one side of the rotary shaft and configured to support the rotary shaft in a direction intersecting the longitudinal direction in which the rotary shaft extends,
    wherein the air, which is discharged from the cooling module and introduced into the return flow path, cools the second bearing while passing through the second bearing.

12. The air supply device of claim 7, wherein a hollow portion is formed in the rotary shaft and extends in a longitudinal direction of the rotary shaft, and the return flow path communicates with the hollow portion.

13. The air supply device of claim 6, further comprising:
    a humidification module configured to receive the air discharged from the cooling module and humidify the air,
    wherein the return flow path is disposed between the cooling module and the humidification module.

14. The air supply device of claim 13, further comprising:
    a fuel cell module into which the air discharged from the humidification module is introduced; and
    a humidification flow path configured to connect the fuel cell module and the humidification module and supply a fluid, which is discharged from the fuel cell module to the humidification module.

15. The air supply device of claim 13, wherein the humidification module faces one side of the compression module based on the leftward/rightward direction W and one side of the cooling module based on a forward/rearward direction F.

16. The air supply device of claim 1, wherein the intake module faces one side of the compression module based on a forward/rearward direction F, and the cooling module faces one side of the compression module based on a leftward/rightward direction W.

17. The air supply device of claim 1, wherein the control module faces one side of the compression module based on an upward/downward direction H.

18. A fuel cell comprising the air supply device of claim 1.

19. A vehicle comprising the fuel cell of claim 1.

* * * * *